United States Patent
Phillips, Jr.

[11] 3,901,993
[45] Aug. 26, 1975

[54] NON-SKID BRIDGING PLATE LAMINATE ASSEMBLY

[76] Inventor: Jacque R. Phillips, Jr., 2 St. Elmo Ct., Apt. 2, Cockeysville, Md. 21030

[22] Filed: Dec. 17, 1973

[21] Appl. No.: 425,677

[52] U.S. Cl. ............ 428/148; 404/20; 404/21; 404/25; 428/143; 428/329; 428/323; 428/63; 428/461; 428/469; 428/494
[51] Int. Cl.² E01C 11/24; B32B 5/16; B32B 15/08
[58] Field of Search ............ 404/25, 19, 20, 21; 161/125, 162, 166, 213, 216, 221, 401

[56] References Cited
UNITED STATES PATENTS

| | | | |
|---|---|---|---|
| 2,165,846 | 7/1939 | Guisman | 404/33 X |
| 2,284,022 | 5/1942 | Schmeller | 404/20 X |
| 2,294,582 | 9/1942 | Sullivan | 404/21 |
| 2,301,721 | 11/1942 | Van der Pyl | 404/21 |
| 3,067,569 | 12/1962 | Kelley | 161/216 X |
| 3,156,168 | 11/1964 | Nagin et al. | 404/21 |
| 3,196,763 | 7/1965 | Rushton | 404/21 |
| 3,352,742 | 11/1967 | Zunich et al. | 161/216 |
| 3,382,136 | 5/1968 | Bugel et al. | 161/216 X |
| 3,400,644 | 9/1968 | Baskin | 404/20 |
| 3,447,460 | 6/1969 | Vincent et al. | 161/216 X |
| 3,544,415 | 12/1970 | Price et al. | 161/221 X |
| 3,767,521 | 10/1973 | Glaser et al. | 161/216 |
| 3,770,560 | 11/1973 | Elder | 161/213 X |

Primary Examiner—George F. Lesmes
Assistant Examiner—Alan T. McDonald
Attorney, Agent, or Firm—John F. McClellan

[57] ABSTRACT

A non-skid bridging plate laminate assembly having a relatively thick and rigid metallic load-carrying plate, a relatively thin and conforming anti-skid metallic sheet with the working surface containing mechanically embedded granules, and an adhesive-coated rubber sheet sandwiched between and uniting the metallic load-carrying plate and anti-skid metallic sheet; pressure-sensitive adhesive is disclosed for the preferred embodiment, and a double-faced embodiment is disclosed.

4 Claims, 6 Drawing Figures

NON-SKID BRIDGING PLATE LAMINATE ASSEMBLY

This invention relates generally to static structural members and specifically to non-skid bridging plate laminates.

The term bridging plate is used here to mean spanning a gap with the ends of the plate supported to permit passage over the gap, as in loading docks, excavation bridges and the like.

In the prior art, numerous laminated plates have been disclosed, some of which can be used for bridging and others not, among which are U.S. Pat. No. 3,400,644 disclosing anti-skid granules in runway surfacing, U.S. Pat. No. 3,196,763 disclosing spot welded two-ply panel with "resilient non-skid surface," U.S. Pat. No. 2,294,582 disclosing rubber covered paving structure, U.S. Pat. No. 2,284,022 disclosing ribbed plate with embedded aloxite, and U.S. Pat. No. 2,165,846 disclosing a steel laminate with a rubber surface, among other disclosures in these cited patents.

However, despite the crowded nature of the field and the long history of development of anti-slip devices for bridging voids which are large relative to the span of the bridging plate no anti-skid bridging plate has been disclosed which is sufficiently economical, durable, safe, simple and versatile to become the standard article of commerce for the purpose. The principal object of this invention is to supply an anti-skid bridging plate which will become the industry standard.

In brief summary given for cursive description only, the invention comprehends providing a load carrying metal plate with a resiliently supported-granule-impregnated-wear-surface, flexibly conforming metal sheet.

Other advantages and objects of this invention will become more apparent on examination of the drawings, in which, like reference numerals referring to like parts:

Figure 1:
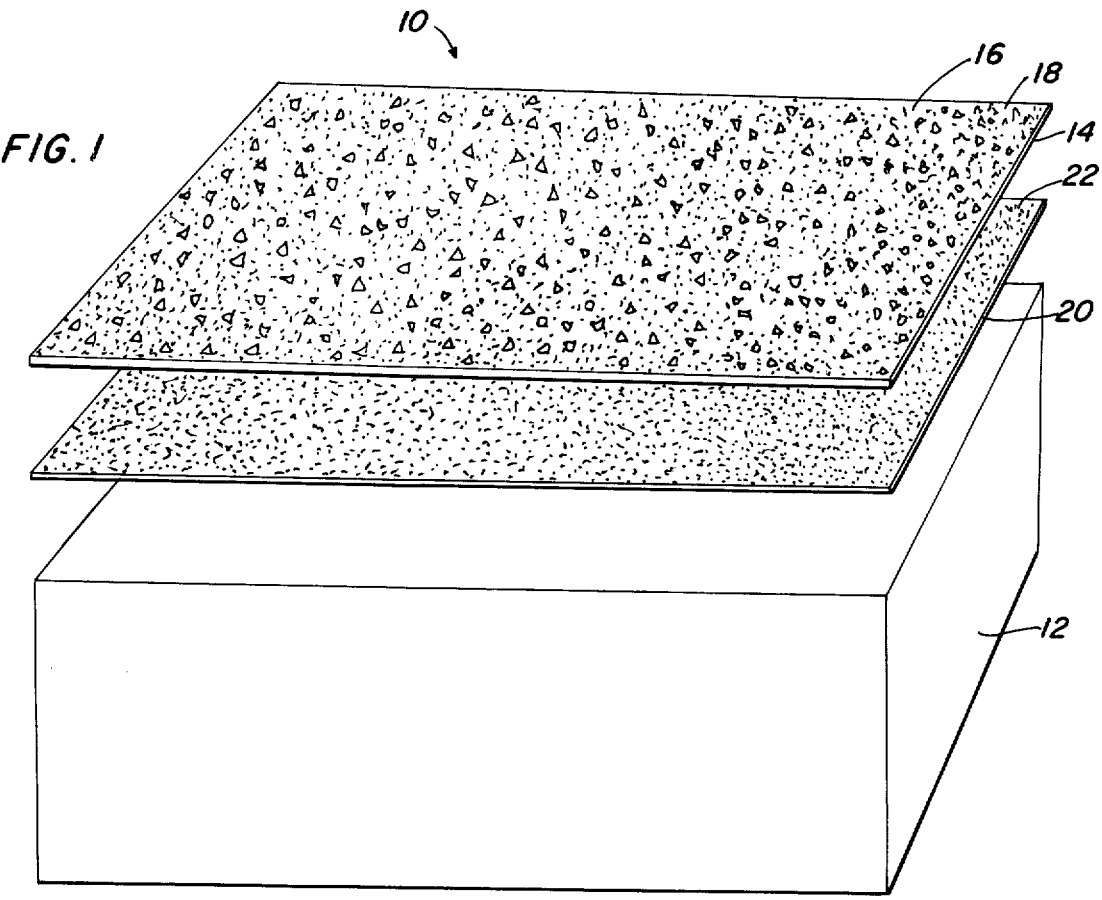
FIG. 1 is an exploded isometric of a bridging plate according to an embodiment of this invention.

Turning now to detailed descriptions of the drawings:

FIG. 1 shows the elements of an embodiment 10 of the invention, including, first, a rolled steel load-carrying plate 12 of the economical, commonly available type often used as bridging plates in spite of surface slickness characterizing them, especially when wet or oil coated. The plate may be as thick as one-half inch for very short spans and as thick as several inches for longer spans. Commonly, for bridging water pipe trenches across streets, one- to one-and-one-half inch thick plate is used.

A non-skid surface in the form of a conformingly thin metal sheet 14, pressure-impregnated with aluminum oxide particles 16 on the upper face 18, is attached to the plate by an intermediate relatively thin sheet 20 of neoprene rubber or the like. In the preferred embodiment, the rubber sheet has a coating of pressure sensitive adhesive such as acrylic adhesive 22 on both faces, making assembly a matter of merely pressing the sandwich together. The granule-embedded sheet is made flexibly conforming by being no thicker than required to hold the particles, one-sixteen inch mild steel being sufficient. The rubber sheet coated with adhesive on both sides makes an "adhesive system" about one thirty-second inch thick in the preferred embodiment, providing resilience and strength without bulk, and being even thinner than the conforming abrasive-embedded metallic sheet, reduces operating deflections to a non-deforming level while sufficiently compensating large-radius bends.

Numerous advantages derive from the structure described. In ordinary sizes, thicknesses and shapes the assembly provides a durable, long wearing bridging member equal to the best unitary granule-impregnated metal plates in skid prevention but at a fraction of the cost of the efficient and longwearing unitary plates. Local procurement of plates 12 reduces shipping and inventory costs of heavy factory-produced unitary antiskid bridging plates while increasing availability, even at remote sites, using either flat-shipped or rolled sheets 14 and 20. Field assembly is easy and secure, and with clean plates practically instantaneous, causing minimum traffic delay surfacing existing installations. Used plates can be used as readily as new except for any degreasing or scaling necessary, and even bent plates can be surfaced by tailoring to them pieces of the metal and rubber sheets, slicing the rubber and shearing, sawing, or flame cutting the impregnated upper sheet as required to fit. Salvage of the plates for other needs after use as bridging plates is simply a matter of pulling off the impregnated metal sheet while burning away or dissolving the rubber, in contrast with aluminum oxide impregnated unitary sheets, which cannot be freed of the embedded material without expensive, difficult surface machining. The rubber, being exposed only at the edges and being in any case resistant to most solvents encountered in the open, is highly resistant to accidental dissolution.

Figure 2:
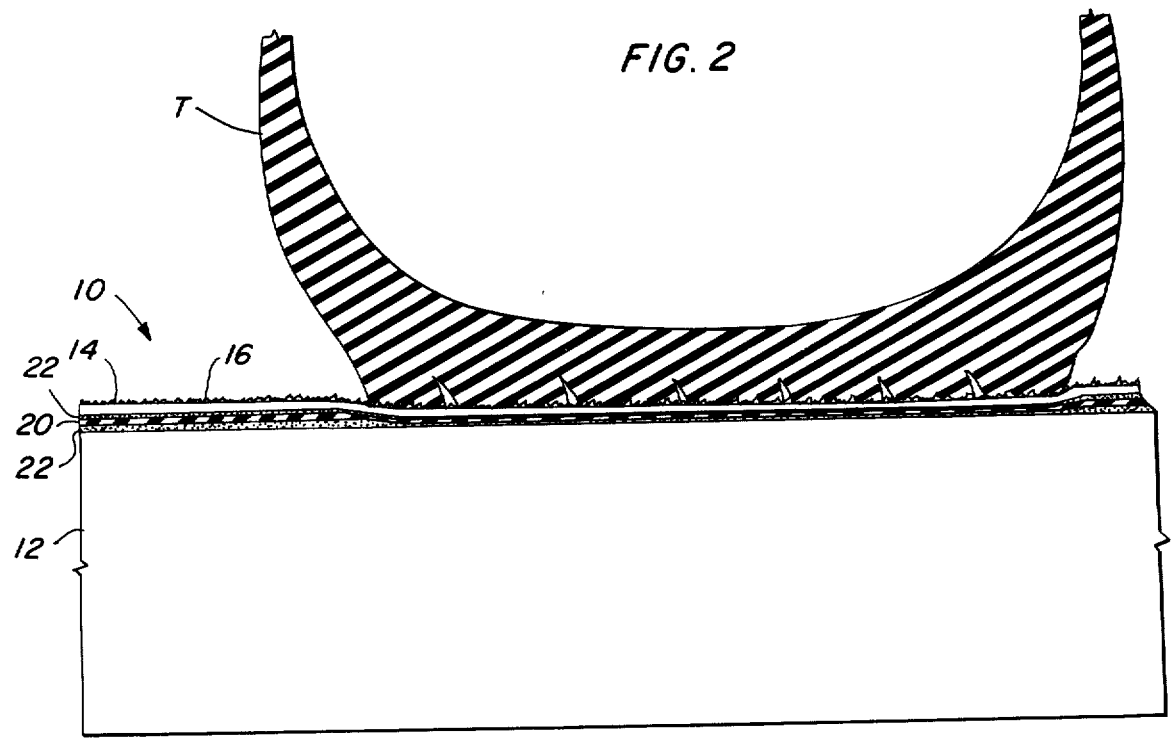
FIG. 2 is an enlarged end-elevation detail of a second embodiment.

FIG. 2 shows the FIG. 1 structure 10 under vehicular vertical and side loading represented by tire section T. Bending and shear loads are accommodated by the rubber/adhesive layer 20, 22 which yields slightly by flexing, reducing particle disruption under local loading, and thus providing longer wear. The slight vertical yield in the layer under load also allows the vehicle tire to sink-in slightly, providing even greater resistance to sliding.

Figure 3:
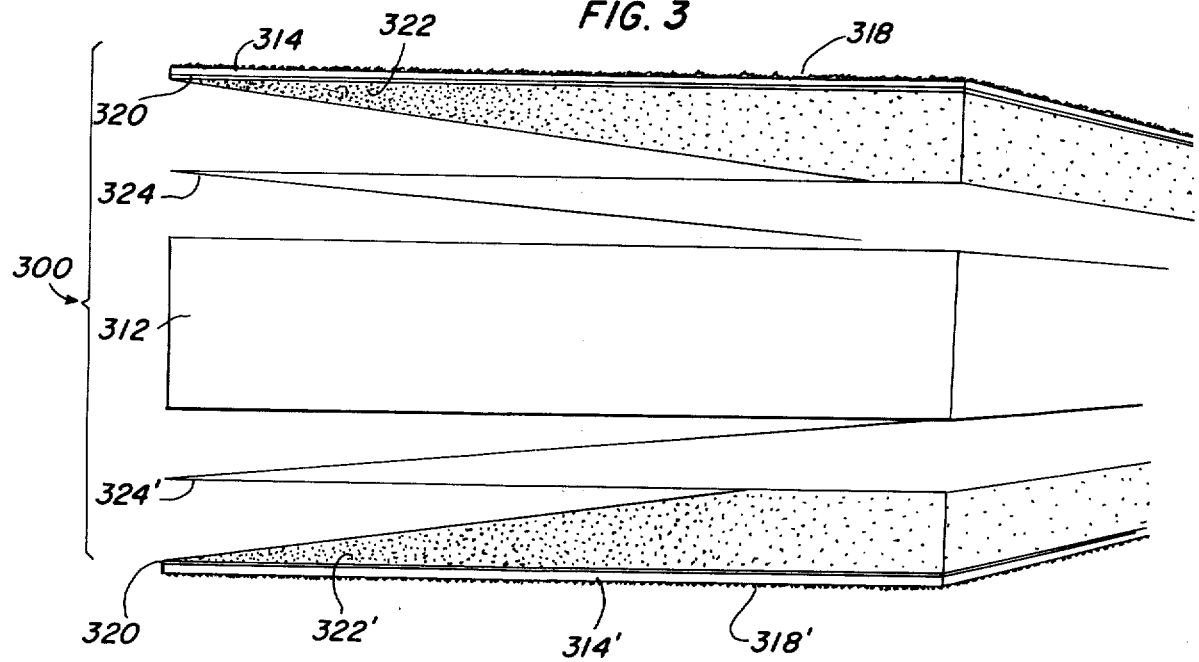
FIG. 3 is a similar view of a second embodiment.
Figure 4:
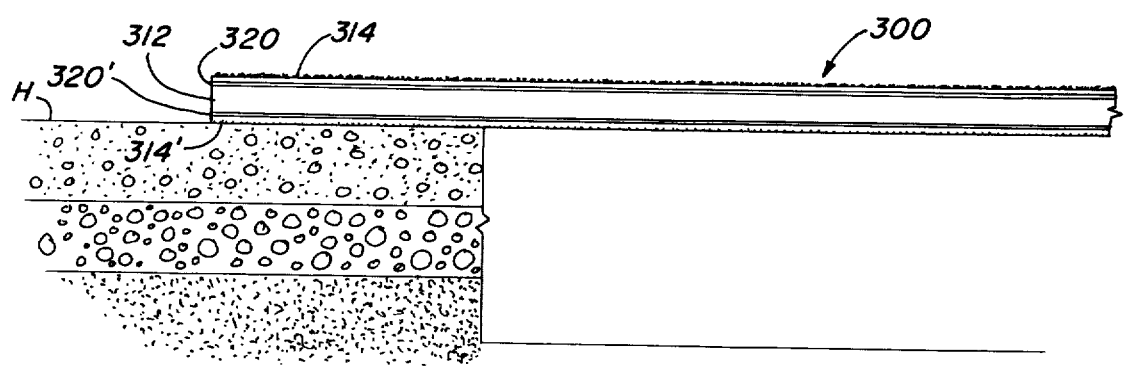
FIG. 4 is a side elevation of a bridging plate embodiment.

FIG. 3 shows an exploded view of a further embodiment 300 and FIG. 4 shows the embodiment 300 in use bridging an opening in a hard surface highway H. In this embodiment, both outer faces 318, 318' of the assembly have anti-skid surfaces applied as previously described. Release sheets 324, 324' such as silicone coated paper in the exploded view indicate that this or the prior embodiment can have the rubber sheet 320 factory-assembled to the granule impregnated sheet 314, and that the release sheets can be removed immediately prior to installation.

Additional advantages apparent in the FIG. 3 and FIG. 4 embodiment include anti-skid grip of the lower surface 314' on the highway surfacing, two wear-faces for double life and as a guard against severe accidental damage to one face, and facility to invert the assembly should the plate 312 get bowed in one direction from excessive loading.

Figures 5, 6:
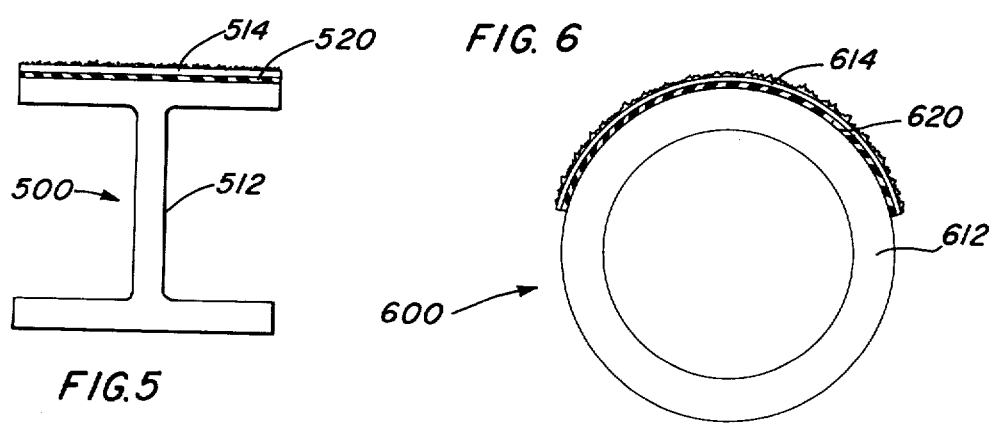
FIGS. 5 and 6 are end elevations of embodiments of the invention.

FIGS. 5 and 6 indicate the versatility with which special shapes 512, 612 can be used as the load carrying member, contrasting with the unavailability of such shapes in unitary granule-embedded forms of bridging plates.

The "adhesive system" specifications are as follows: density 30 to 35 Lb./ft$^3$, normal tensile 55 lb/in$^2$ average per MIL-T-60394, and peel adhesion 50 oz/in average per Method 10 of Federal Test Method No. 147. Almost any standard quality commercial latex-adhesive coated cellulose film (and also "Mylar" film) double-faced tape meets this specification, Scotch Brand No. Y-9122 "Scotch Mount" being one example, the latex being on an approximately 0.001 inch thick "cellophane" sheet.

Obviously, many modifications and variations of the present invention are possible in light of the above teachings. It is, therefore, to be understood that within the scope of the amended claims the invention may be practiced otherwise than as specifically described.

What is claimed and desired to be secured by U.S. Letters Patent:

1. A bridging plate comprising: a metallic load plate, a metallic anti-skid (friction) sheet having abrasive particles embedded in a surface thereof, a resilient rubber sheet between the load plate and the anti-skid sheet, and adhesive means connecting the load plate and the (friction) anti-skid sheet to the resilient rubber sheet, the anti-skid sheet flexibly complying to the load plate contour with the abrasive-particle embedded surface thereof outward.

2. A bridging plate as recited in claim 1, wherein a second metallic anti-skid sheet having abrasive particles embedded in a surface thereof is provided; wherein a second resilient rubber sheet is provided, the same being between the load plate and the second metallic anti-skid sheet, and adhesive means connecting the second resilient rubber sheet between the load plate and the second anti-skid sheet, the second anti-skid sheet flexibly complying to the load plate contour with the abrasive-particle embedded surface thereof outward.

3. A bridging plate as recited in claim 1, wherein the load plate has a surface contour other than planar.

4. A bridging plate as recited in claim 1, wherein the load plate and the anti-skid sheet are of mild steel.

* * * * *